United States Patent
McGhee et al.

(10) Patent No.: US 8,462,781 B2
(45) Date of Patent: Jun. 11, 2013

(54) SYSTEMS AND METHODS FOR IN-LINE REMOVAL OF DUPLICATE NETWORK PACKETS

(75) Inventors: David W. McGhee, Austin, TX (US); Stefan Johansson, Round Rock, TX (US); Shardendu Pandey, Cedar Park, TX (US); Keith E. Chaney, Austin, TX (US); Charles A. Webb, III, Austin, TX (US)

(73) Assignee: Anue Systems, Inc., Austin, TX (US)

( * ) Notice: Subject to any disclaimer, the term of this patent is extended or adjusted under 35 U.S.C. 154(b) by 128 days.

(21) Appl. No.: 13/080,906

(22) Filed: Apr. 6, 2011

(65) Prior Publication Data
US 2012/0257626 A1    Oct. 11, 2012

(51) Int. Cl.
*H04L 12/28* (2006.01)
*H04L 12/56* (2006.01)

(52) U.S. Cl.
USPC .......................... 370/389; 370/390; 370/392

(58) Field of Classification Search
USPC ................. 370/230, 229, 389, 392, 474, 252, 370/256, 401
See application file for complete search history.

(56) References Cited

U.S. PATENT DOCUMENTS

| | | | |
|---|---|---|---|
| 7,363,329 B1 | 4/2008 | Bhagwan et al. | 707/203 |
| 7,400,626 B2 | 7/2008 | Hong | 370/392 |
| 7,406,082 B2 | 7/2008 | Nagarajan et al. | 370/394 |
| 7,619,993 B2 | 11/2009 | Bender et al. | 370/256 |
| 7,729,240 B1 | 6/2010 | Crane et al. | 370/229 |
| 8,179,792 B1 * | 5/2012 | Doerr et al. | 370/230 |
| 2004/0109365 A1 | 6/2004 | Stojancic | |
| 2005/0018668 A1 | 1/2005 | Cheriton | 370/389 |
| 2008/0065639 A1 * | 3/2008 | Choudhary et al. | 707/7 |
| 2009/0158046 A1 | 6/2009 | Milliken et al. | |
| 2009/0225676 A1 | 9/2009 | Kisela et al. | 370/252 |
| 2010/0195519 A1 | 8/2010 | Ji | 370/252 |
| 2011/0206055 A1 * | 8/2011 | Leong | 370/401 |
| 2011/0273982 A1 * | 11/2011 | Akirav et al. | 370/230 |
| 2011/0289281 A1 * | 11/2011 | Spackman | 711/154 |

OTHER PUBLICATIONS

PCT/US12/30881, International Search Report and Written Opinion, Jul. 17, 2012.
Editcap, http://man-wiki.net/index.php/1:editcap, Feb. 19, 2011.
MurmurHash, http://en.wikipedia.org/wiki/MurmurHash, Feb. 2011.

* cited by examiner

Primary Examiner — Chuong T Ho
(74) Attorney, Agent, or Firm — O'Keefe, Egan, Peterman & Enders LLP

(57) ABSTRACT

Systems and methods are disclosed for in-line removal of duplicate network packets in network packet streams operating at high speeds (e.g., 1-10 Gbps and above). A hash generator applies at least one hash algorithm to incoming packets to form one or more different hash values. The packet deduplication systems and methods then use the one or more hash values for each incoming packet to identify data stored for previously received backs and use the identified data to determine if incoming packets are duplicate packets. Duplicate packets are then removed from the output packet stream thereby reducing duplicate packets for downstream processing. A deduplication window can further be utilized to limit the amount of data stored for previous packets based upon one or more parameters, such as an amount of time that has passed and/or a number of packets for which data has been stored. These parameters can also be selected, configured and/or adjusted to achieve desired operational objectives.

48 Claims, 6 Drawing Sheets

SYSTEMS AND METHODS FOR IN-LINE REMOVAL OF DUPLICATE NETWORK PACKETS

TECHNICAL FIELD OF THE INVENTION

This invention relates to network communications and, more particularly, to real-time processing of network packet streams.

BACKGROUND

There is often a need with electronic systems to monitor network traffic. As such, devices have been developed that analyze data packets within network packet streams that are communicated across networks. These network communications can occur through a number of different systems and can include both wired and wireless communication links. The analysis of network packets can occur both off-line and in real-time. For off-line analysis of network packets, the network packets are stored and then later analyzed without providing real-time data network analysis. For real-time analysis of network packets, the network packets within the packet stream must be analyzed fast enough to keep up with the real-time flow of network traffic. As such, real-time analysis is more difficult to achieve than off-line analysis of network data packets.

One problem associated with analysis of network packets is the large number of packets that are communicated and the speed at which they are communicated. For example, many network systems utilize communication links that operate at speeds of 1-10 Gbps (gigabits per second) and above. And many network communication systems have large numbers of active communication links at a time. This problem of analyzing network packets in high volume and high speed networks is made worse because many devices that analyze network packets do so using filters and other parameters that can cause duplicate packets to be present in the packet streams being analyzed. For example, monitoring redundant communication links, monitoring both ends of a communication link, and mis-configuration of copy ports (e.g., SPAN ports on Cisco network switches) can lead to duplicate packets in network packet streams to be analyzed. These duplicate packets increase the bandwidth and processing speed needed by the analyzing devices to process packet streams.

One prior solution to this problem of duplicate packets is simply to provide off-line removal of duplicate packets followed by off-line analysis of captured network packets. For this off-line solution, packets within a network packet stream can be captured and stored. The captured packet data file can then be processed to remove duplicate packets. For this removal of duplicate packets, for example, length and MD5 sum for packets can be compared to the previous packets (e.g., previous four packets), and matching packets can be removed as duplicates. It is noted that MD5 is a known, large cryptographic hash algorithm, which can be used to generate large hash values. Once duplicate packets are removed, the packet data file can then be analyzed for various events and/or occurrences, as desired.

While this prior solution provides some ability to eliminate duplicate packets for off-line processing, it is desirable to provide real-time solutions that remove duplicate packets from network packet streams.

SUMMARY OF THE INVENTION

Systems and methods are disclosed for in-line removal of duplicate network packets in network packet streams. The packet deduplication systems and methods disclosed can operate at high speeds, including speeds at 1-10 Gbps (gigabits per second) and above, so that real-time downstream processing of deduplicated packet streams is possible. The packet deduplication system and methods disclosed use a hash generator to apply at least one hash algorithm to incoming packets to form one or more different hash values. The packet deduplication systems and methods then use the one or more hash values to identify data stored for previously received packets, and this data is used to determine if incoming packets are duplicate packets. If packets are determined to be duplicate packets, the packets are removed from the output packet stream thereby reducing duplicate packets for downstream processing. The packet deduplication systems and methods can further utilize a deduplication window to limit the amount of data stored for previous packets based upon one or more parameters, such as an amount of time that has passed since packet related data was stored and/or a number of packets for which data has been stored. The parameters that are used by a deduplication window controller to determine this deduplication window can also be selected, configured and/or adjusted to achieve desired operational objectives. Other features and variations can be implemented, if desired, and related systems and methods can be utilized, as well.

In one embodiment, a packet deduplication system is provided for reducing duplicate packets in a packet stream, including a packet buffer configured to store a plurality of incoming packets from an input packet stream, a hash generator configured to apply at least one hash algorithm to at least a portion of the plurality of incoming packets to generate hash values where the portion represents packets to be processed for deduplication, a data storage system configured to store data associated with previously received packets, and a deduplication controller. The deduplication controller is configured to use a hash value for each packet to be processed to identify data stored in the data storage system, to use the identified data to determine if the packet matches a previously received packet, and to generate a control signal based at least in part upon the match determination, where the control signal determines whether the packet is deleted as a duplicate packet or passed from the packet buffer to an output packet stream as a non-duplicate packet. Further, the deduplication controller is configured to store data in the data storage system for packets determined not to match previously received packets. In a further embodiment, the packet buffer is configured to store all of the incoming packets within the input packet stream. In a still further embodiment, the hash generator is configured to apply at least one hash algorithm to all of the plurality of incoming packets stored by the packet buffer.

In another embodiment, the deduplication controller is configured to use the hash value to determine an address location within the data storage system. Still further, the data stored in the data storage system can include content from previously received packets, and the deduplication controller can be further configured to compare content from each incoming packet with content from previously received packets for the match determination. Still further, the data storage system can include a first memory device and a second memory device, where the first memory device is configured to store pointers to the second memory device, where the address location is an address location within the first memory device and where the second memory device is configured to store content from previously received packets.

In a still further embodiment, the hash generator is configured to generate at least two hash values for each incoming packet, where the first hash value is used to determine an address location within the data storage system, where the second hash value is used as data stored in the data storage system, and where the deduplication controller is further configured to compare hash values for the match determination. Still further, the data storage system can be configured to hold one or more hash values in a plurality of storage locations associated with each address location. In addition, one or more control bits can be associated with each storage location to identify whether the storage location holds a hash value. Still further, the first hash value for each packet can be smaller than the second hash value for each packet. In a further embodiment, the deduplication controller is configured to compare content within an incoming packet to content within previously received packets if the incoming packet is determined to match a previously received packet.

In another embodiment, the packet deduplication system includes a deduplication window controller configured to provide a remove signal to the deduplication controller, where the remove signal is based upon one or more parameters and where the remove signal is used by the deduplication controller to remove data stored in data storage system associated with previously received packets. In a further embodiment, the one or more parameters can include an elapsed amount of time associated with data stored for one or more previously received packets. Still further, the one or more parameters can include a number of previously received packets for which data has been stored. Further, the one or more parameters can include a count value associated with a number of times a packet has been received. In a still further embodiment, the one or more parameters are configurable.

In a further embodiment, the incoming packets are held within the packet buffer for less than about 20 microseconds if passed as a non-duplicate packet. In another embodiment, the incoming packets are held within the packet buffer for less than about 2 microseconds if passed as a non-duplicate packet. In a further embodiment, the incoming packets can be held within the packet buffer for less than about 1 second if passed as a non-duplicate packet.

In one embodiment, a method is provided for reducing duplicate packets in a packet stream, including storing a plurality of incoming packets from an input packet stream, applying at least one hash algorithm to at least a portion of the plurality of incoming packets to generate hash values where the portion represents packets to be processed for deduplication, using a hash value for each packet to be processed to identify data stored in a data storage system for previously received packets, and determining if the packet matches a previously received packet using the identified data. Further, if the packet is determined to match a previously received packet, the method further includes deleting the packet as a duplicate packet. Alternatively, if the packet is determined not to match a previously received packet, the method further includes passing the packet to an output packet stream as a non-duplicate packet and storing data associated with the packet in the data storage system as data for a previously received packet. In a further embodiment, the method includes storing all of the incoming packets within the input packet stream. Still further, the method can include applying at least one hash algorithm to all of incoming packets.

In another embodiment, the method includes using the hash value to determine an address location within the data storage system. Still further, the data stored in the data storage system can include content from previously received packets, and the method can further include comparing content from each incoming packet with content from previously received packets for the determining step. In a further embodiment, the method can include generating at least two hash values for each incoming packet, using a first hash value to determine an address location within the data storage system, and using a second hash value as comparison data for the determining step. In further embodiments, the method can also include holding one or more hash values in a plurality of storage locations associated with each address location and utilizing one or more control bits associated with each storage location to identify whether the storage location holds a hash value. In a further embodiment, the method can further include comparing content within an incoming packet to content within previously received packets if the incoming packet is determined to match a previously received packet. Further, multiple hash algorithms can be used to generate the plurality of hash values, or one hash algorithm could be used to generate the plurality of hash values, as desired.

In a further embodiment, the method includes utilizing a deduplication window based upon one or more parameters to remove data stored in the data storage system associated with previously received packets. Still further, the method can include utilizing elapsed amount of time associated with data stored for one or more previously received packets as a parameter for the deduplication window. The method can also include utilizing a number of previously received packets for which data has been stored as a parameter for the deduplication window. Still further, the method can include utilizing a count value associated with a number of times a packet has been received as a parameter for the deduplication window. Still further, the one or more parameters are configurable. In one further embodiment, the method can include dynamically configuring a parameter based upon one or more network conditions. The method can also include allowing a parameter to be configured through a user interface.

In another embodiment, the method can include holding incoming packets for less than about 20 microseconds if passed as a non-duplicate packet. In a further embodiment, the method can include holding incoming packets for less than about 2 microseconds if passed as a non-duplicate packet. Still further, the method can include holding incoming packets for less than about 1 second if passed as a non-duplicate packet.

Other features and variations can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1A:
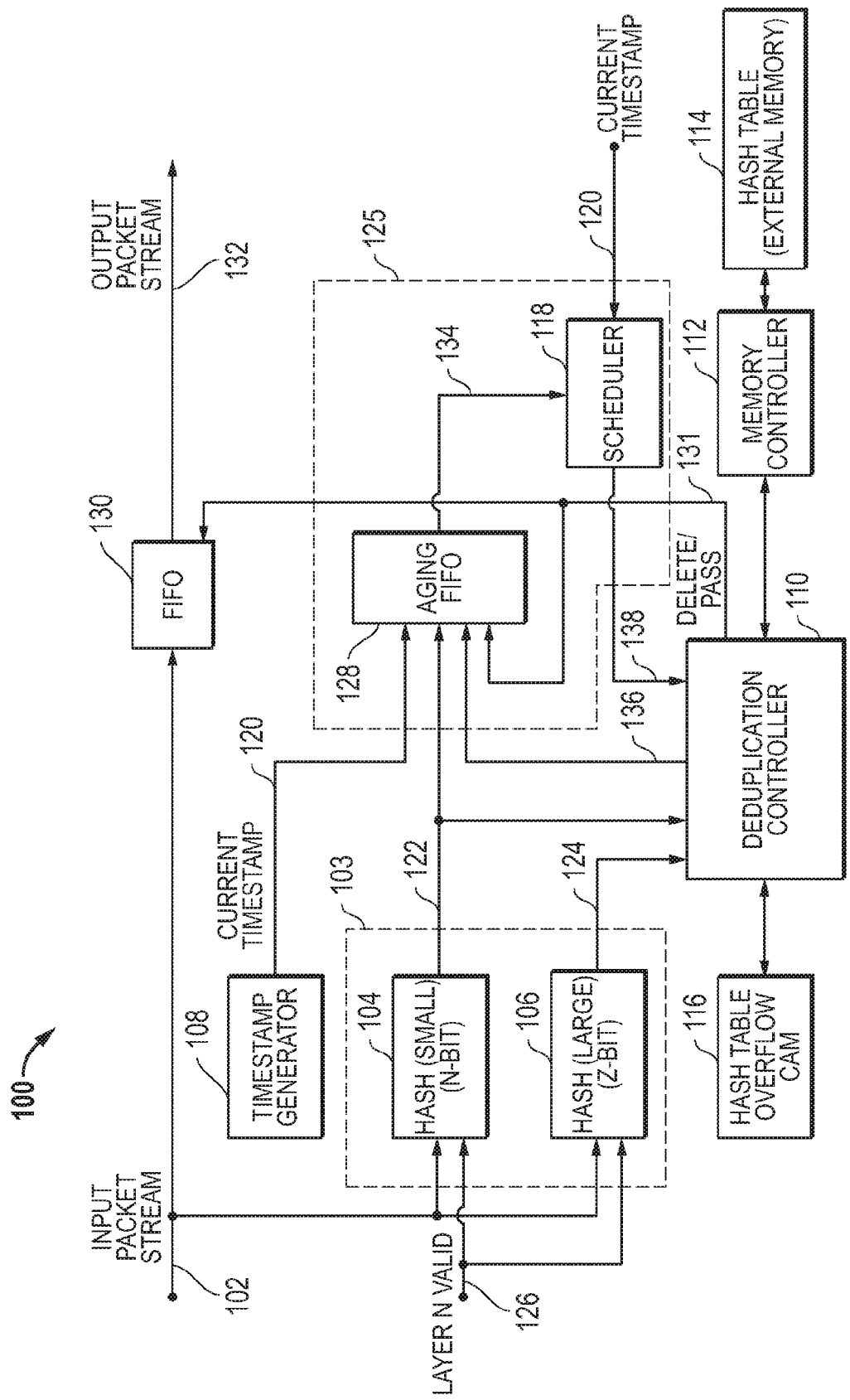
FIG. 1A is a block diagram of an example embodiment for a deduplication system that provides for in-line removal of duplicate packets in incoming packet streams.

Systems and methods are disclosed for in-line removal of duplicate network packets in network packet streams, and these systems and methods can operate at high speeds, such as at 1-10 Gbps (gigabits per second) and above. As described further below, the systems and methods disclosed utilize a hash generator to apply at least one hash algorithm to incoming packets to generate at least one hash value. The packet deduplication systems and methods then use the hash value for each incoming packet to identify data stored for previously received packets. This data is then used to determine if incoming packets are duplicate packets. Duplicate packets are then removed from the output packet stream thereby reducing duplicate packets for downstream processing and allowing for real-time processing of deduplicated network packet streams at high speeds. A deduplication window can further be utilized to limit the amount of data stored for previously received packets based upon one or more parameters. These parameters can include, for example, an amount of time that has passed, a number of packets for which data has been stored and/or other desired parameters. Further, these parameters can also be selected, configured and/or adjusted to achieve desired operational objectives. Other features and variations can be implemented, if desired, and related systems and methods can be utilized, as well.

The embodiments described herein conserve downstream processing bandwidth by removing duplicate packets from a packet stream in real-time. In particular, the embodiments described herein provide in-line removal of duplicate packets and can operate at high speeds, such as speeds where the underlying data rate is 1 Gbps (gigabits per second) or more including speeds at 10 Gbps or more. Because it may not be practical to remove all duplicate packets over all time for such high speed data streams due to the large memory resources that could be required for such a solution, a deduplication window is used by certain embodiments disclosed to provide for removal of most, if not all, duplicate packets within the deduplication window. The deduplication window can be defined using one or more of a variety of parameters, including a period of time, a number of stored prior packets, and/or other parameters used alone or in combination, and these parameters can be made to be configurable, if desired. In general, it is noted that larger deduplication windows allow for removal of more duplicate packets, and smaller deduplication windows allow for the removal of fewer duplicate packets. However, high speed performance can suffer if deduplication windows are made too large thereby requiring the in-line processing of large amounts of packet related data. As such, the deduplication window can be selected, adjusted and/or configured to achieve desired operational objectives for particular implementations of the disclosed embodiments.

It is noted that if an ideal solution were attempted so that all duplicate packets were to be discarded over all time for a packet stream, at least two significant problems arise. First, memory depth would be a problem as all non-duplicate packets in the packet stream would need to be stored for future comparison with incoming packets to ensure no duplicate packets were allowed to pass. Over time, therefore, the memory storage would need to be infinitely large to store all packets over all time for the packet stream. Second, memory bandwidth would be a problem, if real-time processing is desired, as the input packet stream needs to be processed fast enough so as not to slow down the delivery of the output packet stream for downstream processing in real-time. Even if an infinite memory were available to solve the first memory depth problem, this memory and the related processing would have to become infinitely fast in order not to degrade the speed of the output packet stream and thereby allow for real-time downstream processing.

As described herein, a deduplication window and associated parameters can be utilized to reduce the number of previous packets being analyzed to a finite set within the deduplication window (e.g., window based on time, number of packets, etc.). However, even within this deduplication window, memory depth and memory bandwidth can still create potential performance hurdles.

To address memory depth problems, a large data storage device can be used to temporarily store data associated with previously received packets that are being used for comparison with currently received packets. For example, large memory devices can be used for this data storage, and the large memory devices can be, for example, large external memory devices such as one or more DRAM (dynamic random access memory) integrated circuits. However, the use of large memory devices, and in particular large external memory devices that are often accessed through a memory controller, can put tighter constraints on memory bandwidth.

To address memory bandwidth problems, and to conserve memory bandwidth while searching for previously received packets, the data storage devices used herein can be organized to facilitate the retrieval of stored information. For example, in certain embodiments described herein, hash values associated with incoming packets are used as index values or address values for the storage and retrieval of data within a data storage system. To address potential hash collision problems, a multi-dimensional data table can be configured and used within the data storage system, such that multiple entries for packet hash values are stored with respect to each hash index/address value. Further, an overflow data storage device, such as a CAM (content addressable memory), can be used to store data for packets when the multi-dimensional table is full for a particular hash index/address value.

To further conserve memory bandwidth and depth, instead of storing the actual data content associated with the previously received network packets, a hash value can instead be used to create a message digest for each packet that is smaller in size than the packet itself. For example, an 8-byte hash digest can be generated and used for the network packets. Thus, a hash value can be stored instead of the entire packet, and this hash value can then be compared to hash values for later packets to determine duplicate packets. It is noted, for example, that storing an 8-byte hash instead of the data packet itself would be expected to reduce the memory bandwidth required by over 85% for a typical network packet stream being communicated across an Ethernet-based network.

Figure 1B:
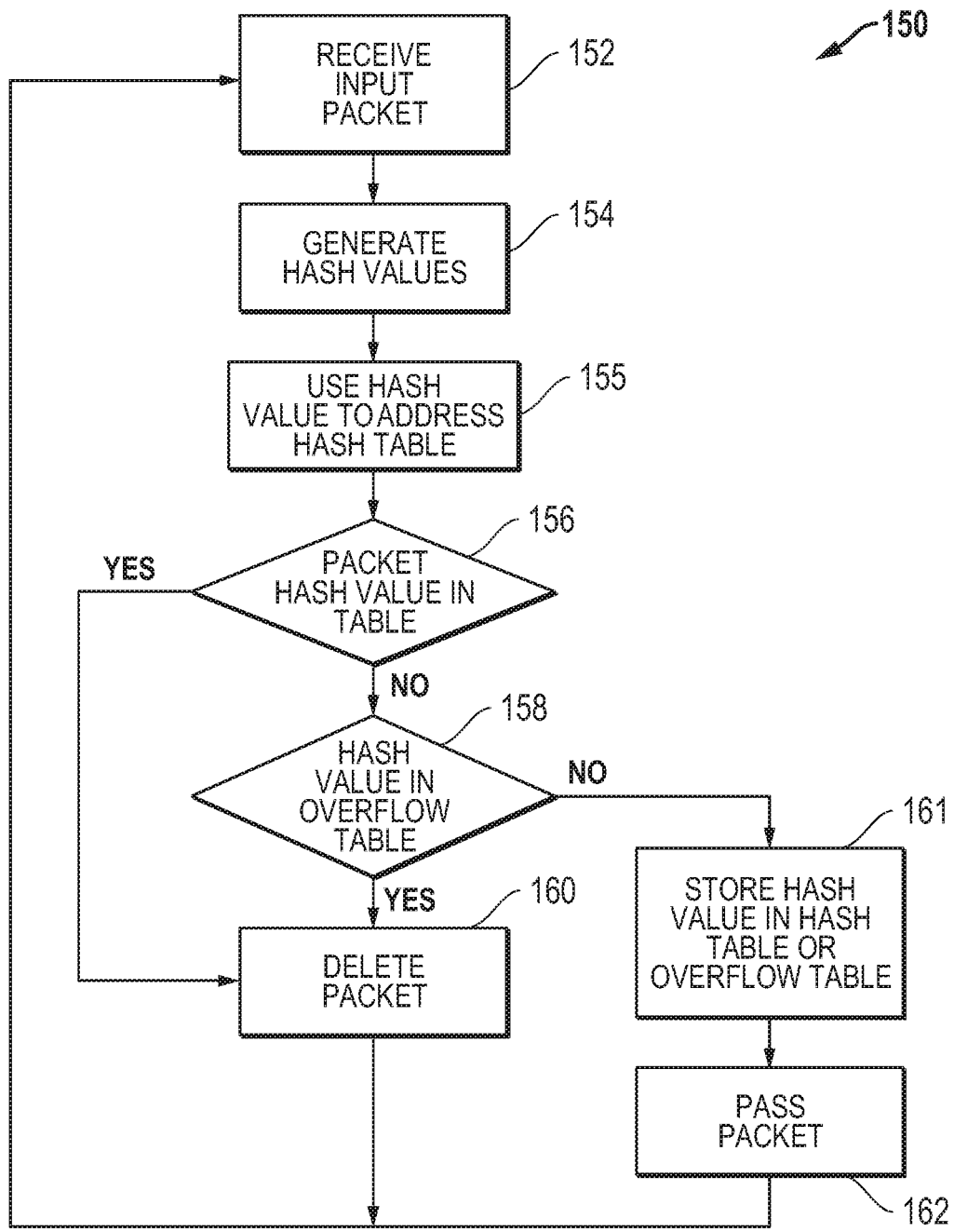
FIG. 1B is a flow diagram of an example embodiment for in-line removal of duplicate network packets using both a hash table and an overflow table.
Figure 2A:
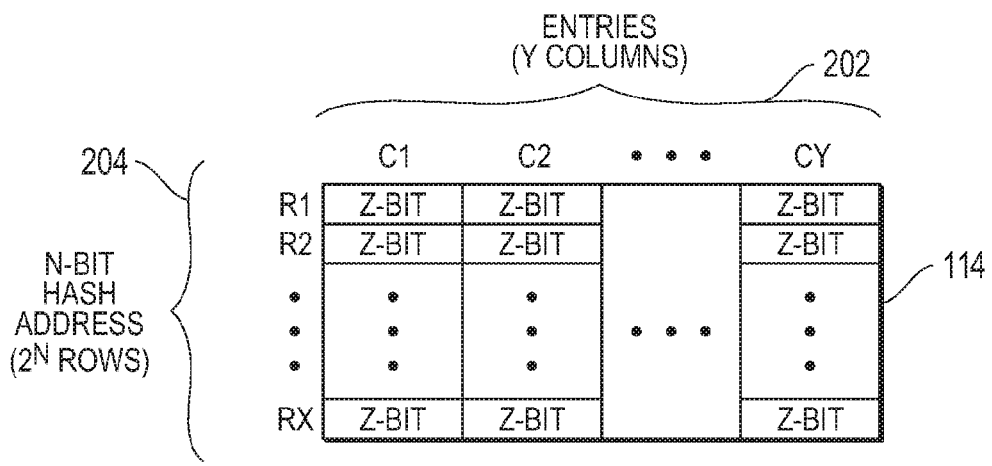
FIG. 2A is a diagram of an example embodiment for configuration of a hash table that can be utilized by the deduplication system of FIG. 1A.
Figure 2B:
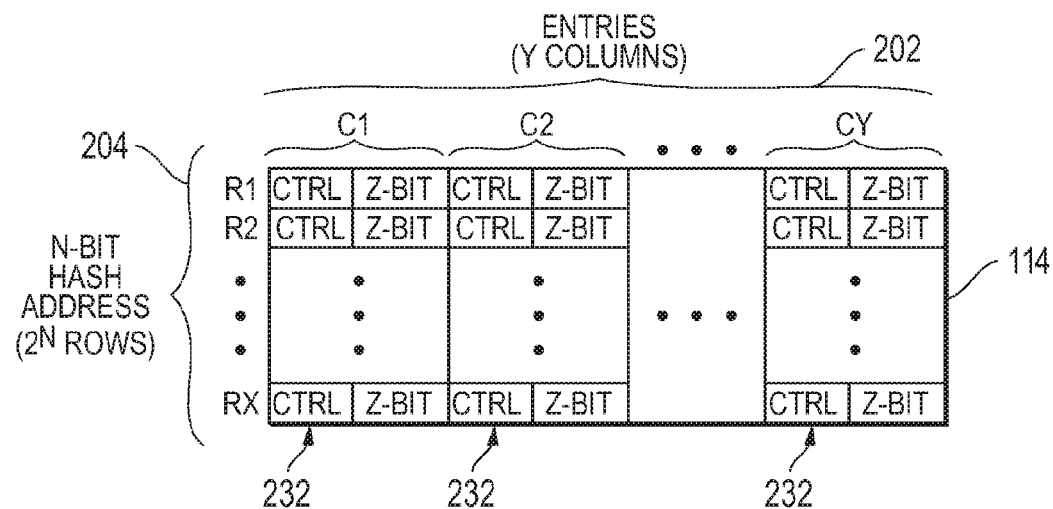
FIG. 2B is a diagram of an example embodiment for configuration of a hash table including one or more control bits that can be utilized by the deduplication system of FIG. 1A.
Figure 2C:
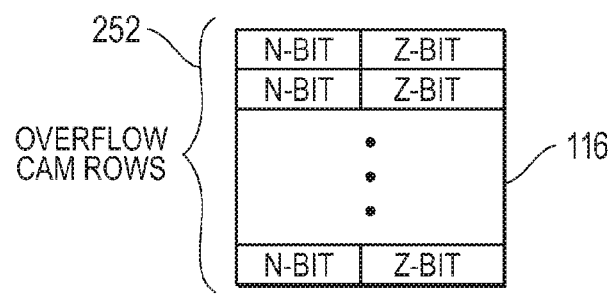
FIG. 2C is a diagram of an example embodiment for configuration of an overflow memory that can be utilized by the deduplication system of FIG. 1A.
Figure 3:
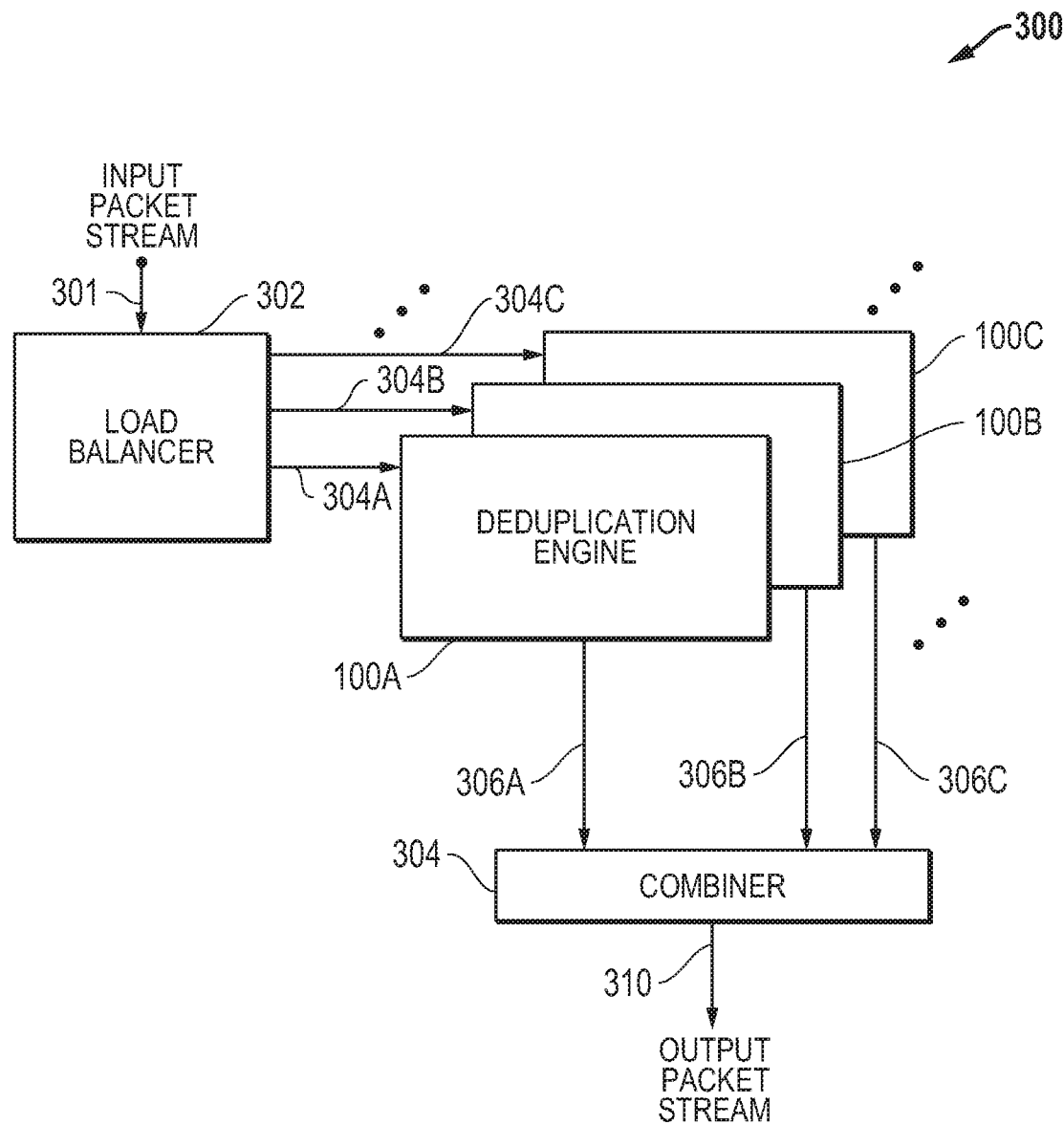
FIG. 3 is a block diagram of an embodiment for using load balancing and multiple deduplication engines to process an input packet stream.
Figure 4:
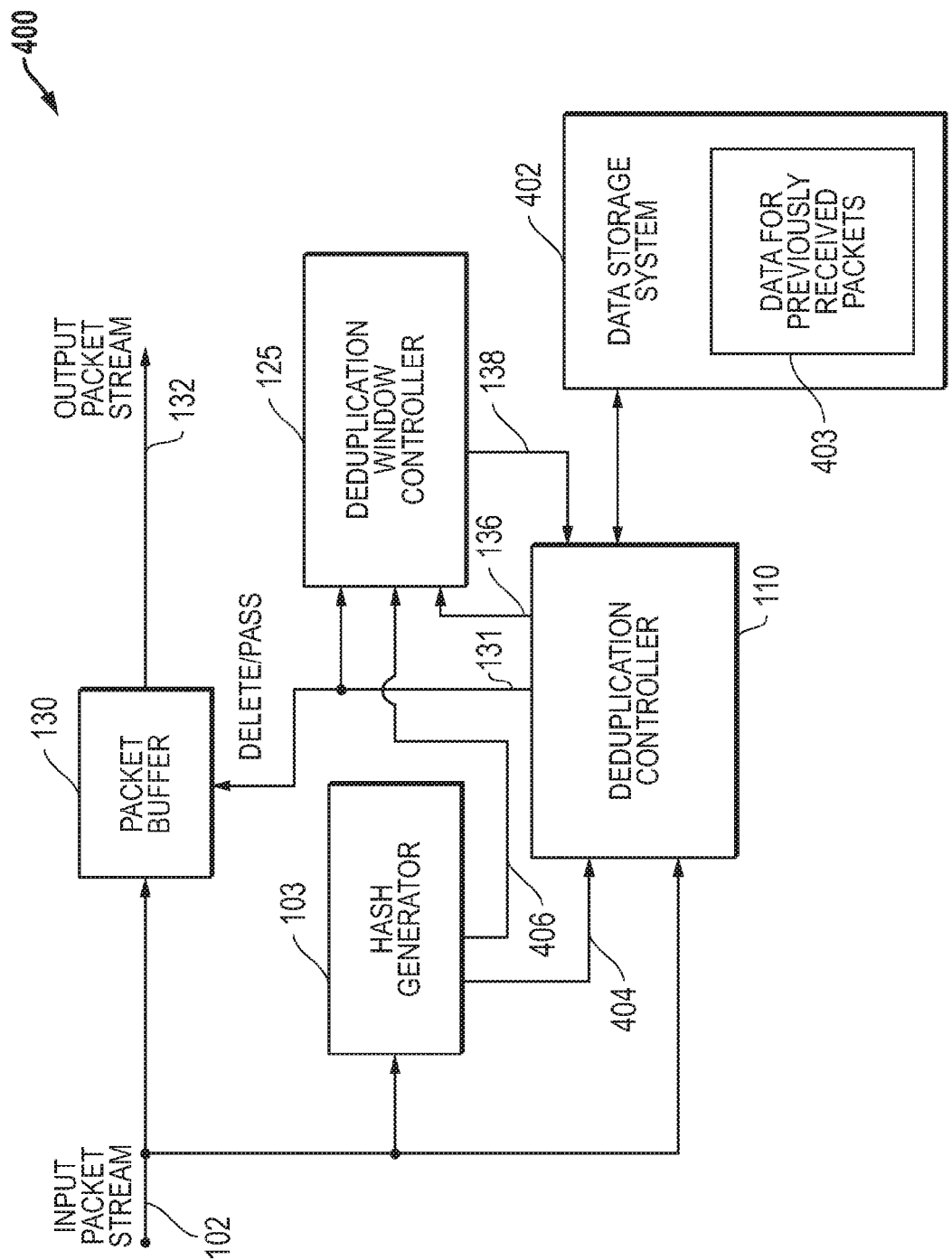
FIG. 4 is a block diagram of another embodiment for a packet deduplication system.
Figure 5A:
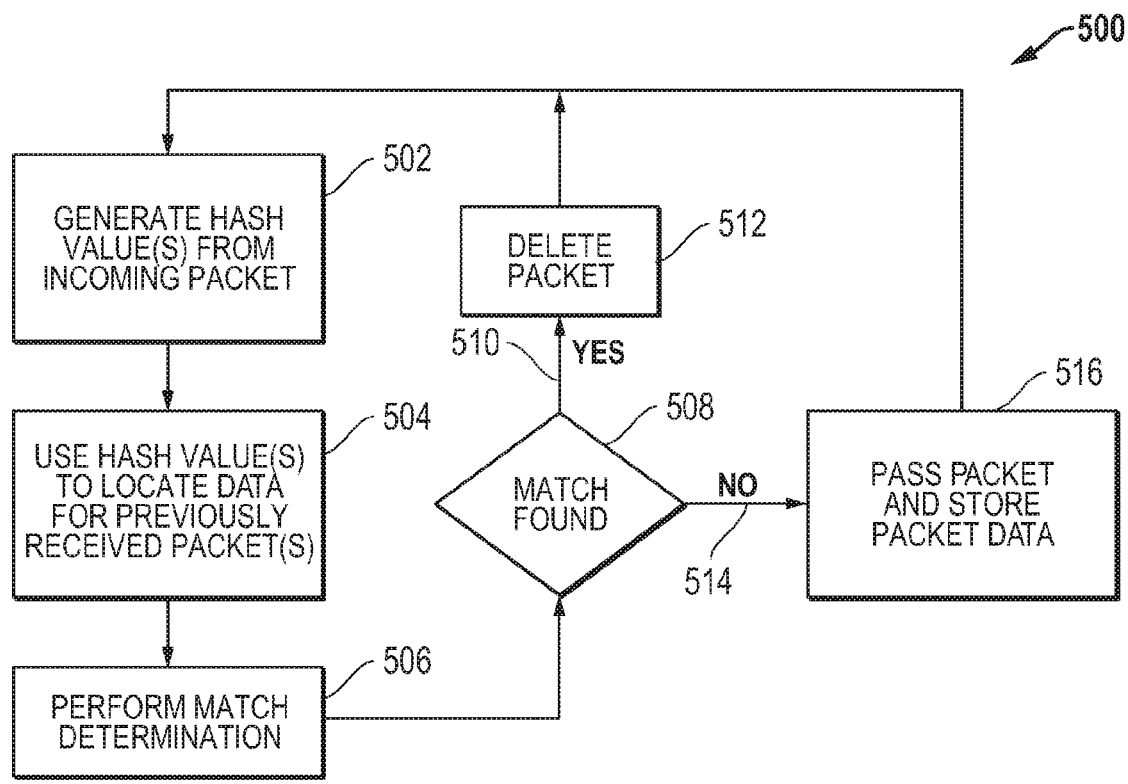
FIG. 5A is a flow diagram of an example embodiment that utilizes one or more hash values to perform a match determination for identifying duplicate packets.
Figure 5B:
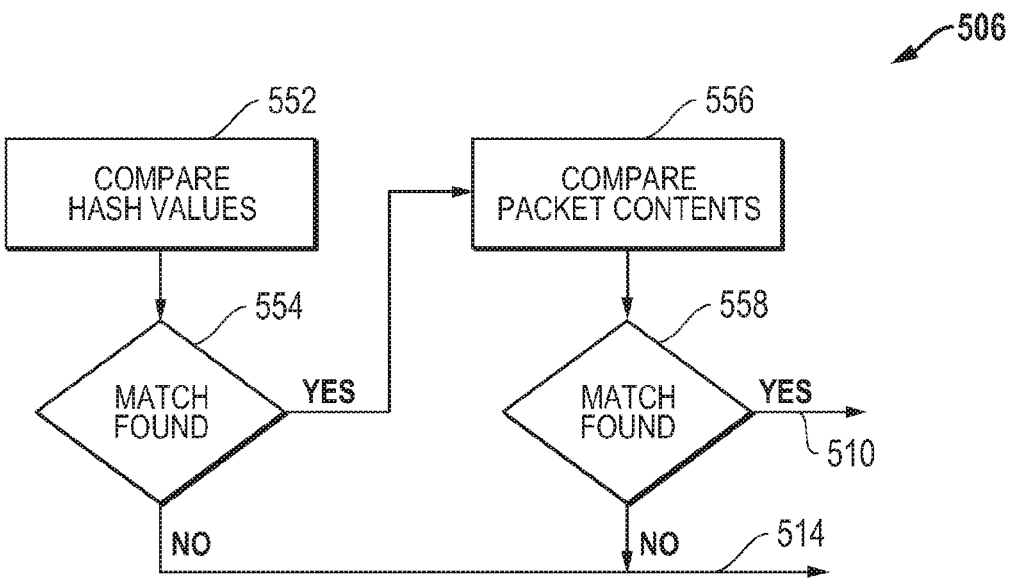
FIG. 5B is a flow diagram of an example embodiment for performing a match determination using one or more match determination steps.

Example embodiments for deduplication systems and methods will now be described in more detail with respect to the drawings. FIGS. 1A and 1B provide example block and process diagrams for deduplication systems and methods. FIGS. 2A, 2B and 2C provide example diagrams for organization of memory devices used to store data associated with network packets being processed. FIG. 3 provides a block diagram for using load balancing among multiple deduplication engines. FIG. 4 provides an additional block diagram for another embodiment of a deduplication system. FIG. 5A provides an example flow diagram for using one or more hash values to perform a match determination for identifying duplicate packets, and FIG. 5B provides an example flow diagram for performing a match determination using one or more match determination steps.

Looking first to FIG. 1A, a block diagram of an embodiment for a deduplication system 100 is provided for in-line removal of duplicate packets in an input packet stream 102. In particular, the deduplication system 100 is advantageous for processing incoming packets in high speed packet streams such as packet streams operating at speeds of 1 gigabits per second (1 Gbps) or more. More particularly, the deduplication system 100 is advantageous for processing incoming packets in high speed packet streams such as packet streams operating at speeds of 10 gigabits per second (10 Gbps) or more. As described herein, the deduplication system 100 utilizes hash values generated from incoming packets within an input packet stream 102 to determine if a current incoming packet has already been received. If already received, the packet can be deemed a duplicate packet and can be deleted such that it is removed from the output packet stream 132. If not already received, the packet can be passed such that it becomes part of the output packet stream 132. It is noted that the deduplication system 100 provides one example embodiment for using hash values for incoming packets to identify and remove duplicate packets. It is further noted that a portion of the incoming packets could be processed for deduplication, if desired, such that not all of the received incoming packets are processed through the deduplication system. Other variations could also be implemented and utilized as desired.

For the embodiment 100 depicted, the incoming packets in the input packet stream 102 are first received by a packet buffer 130, such as a FIFO (first-in-first-out) buffer. The input packets are stored in the FIFO buffer 130, and each packet is either passed along as part of the output packet stream 132 or deleted based upon a DELETE/PASS control signal 131 provided by the deduplication controller 110. For the embodiment 100, the deduplication controller 110 utilizes two hash values associated with each incoming packet to determine if the packet has already been received. If the packet is determined to be a duplicate packet, the control signal 131 will provide a DELETE command to FIFO buffer 130, and the packet will be deleted so that it is not output by the FIFO buffer 130 as part of the output packet stream 132. If the packet is not determined to be a duplicate packet, the control signal 131 will provide a PASS command to the FIFO buffer 130, and the packet will be passed along as part of the output packet stream 132.

In addition to being provided to the FIFO buffer 130, the incoming packets within the input packet stream 102 are also provided to one or more hash algorithms within a hash generator 103. The hash generator 103 generates hash values associated with the incoming packets within the input packet stream 102. For the embodiment depicted, a first hash process 104 receives the input packet stream 102 and generates first (N-bit) hash values 122 for the incoming packets, and a second hash process 106 receives the input packet stream 102 and generates second (Z-bit) hash values 124 for the incoming packets. For the embodiment depicted, the first (N-bit) hash values 122 are preferably smaller than the second (Z-bit) hash values 124. These first and second hash values 122 and 124 are then provided to the deduplication controller 110 and are used by the deduplication controller 110 to determine if the packets are duplicates.

It is also noted that portions of the content within a packet can be selected and used for generating the hash values rather than using the entire packet. For example, if only information relating to certain network protocol layers are desired to be used (or not to be used) for generating the hash values, they can be identified by a control signal provided to the hash algorithms being utilized. The embodiment shown with respect to system 100 includes a network layer control signal (Layer N Valid) 126 that is provided to hash generators 104 and 106. In operation, this network layer control signal (Layer N Valid) 126 identifies which network layers are valid (or invalid) for hash generation and thereby determines which portions of the network packet content are to be used for generating the small and large hash values 122 and 124. Further, if desired, different network layer control signals could be provided to blocks 104 and 106 for generation of different hash values. It is further noted that portions of a packets that could be utilized or not utilized in generating hash values include, for example, MAC addresses, VLAN designations, source designations, destination designations, data payload, checksum data and/or any other desired portion of a packet.

A variety of techniques can be utilized to implement the hash generator 103 in order to generate the hash values that are used by the deduplication controller 110. For example, a single hash algorithm could be used to generate one or more hash values. Further, a single hash algorithm could be used to generate a single hash value that is then used to provide two or more different hash values. For example, a portion of the single hash value could be used to provide the first hash value, and a portion of the single hash value could be used to provide the second hash value. Further, these portions could overlap. Still further, a single hash algorithm could be used to form two different hash values based upon different parameters (i.e., different shift constants, different mixing functions and/or other different parameters). Still further, two or more different hash algorithms could be used to each generate one or more different hash values. In short, the hash generator 103 can be implemented using a wide variety of techniques, as desired, to generate one or more hash values that can be used by the embodiments described herein.

It is further noted that any desired hash algorithm could be used. However, the hash algorithm or algorithms that are used in the deduplication system are preferably selected based on standard criteria for good hash functions, including low bias avalanche properties and good distribution for chi-squared bucket tests. Preferably, the small hash value 122 and the large hash value 124 will be uncorrelated in order to yield improved performance. As indicated above, the hash values can be generated through a variety of implementations. For example, the hash values can be achieved by taking two different bit-slices of a large hash (e.g., SHA-1 or MD5 for instance), by applying two different hash functions, or by applying the same hash function with different input parameters. Further, the hash value generation technique selected is preferably one that can keep up with line rate either by itself or with multiple instances of the same hash algorithm running in parallel so that real-time downstream processing is possible. It is also noted that where multiple hash values are used by a deduplication system embodiment, the use of different hash functions to generate these multiple hash values will likely lead to fewer hash collisions problems and thereby improve overall performance in avoiding false duplicate packet indications.

It is noted that SHA-1, MD5, FNV and MurmurHash are known algorithms for generating hash values based upon selected input parameters. It is further noted that large cryptographic hash algorithms, such as MD5, may be difficult to utilize for the deduplication systems described herein because they tend to be complex and slow algorithms. It is also noted that PRBS, CRC and other cyclical polynomial computations (e.g., Reed Solomon) could also be utilized to generate hash values. While these cyclical polynomial computations can be easier to implement in hardware, they typically provide worse performance with respect to desirable hash parameters. Non-cryptographic hash algorithms, therefore, are preferably used to provide the hash values. If desired, a non-cryptographic MurmurHash-type hash algorithm can be used and can be split into multiple 16-bit hash processes that execute in parallel followed by a final series of mixing steps. The mixing steps can be operated at 200 MHz or above, if desired. For one example implementation according to the embodiment of FIG. 1A, the large second hash value 124 for each packet can be generated as a 64-bit version of the hash algorithm. And the small first hash value 122 for each packet can be a 21-bit hash value generated from a 64-bit version of the hash algorithm with different input mix parameters that is subsequently folded to a 21-bit hash value. As such, the two hash values 122/124 can both be generated using a MurmurHash-type hash algorithm.

Looking back to the embodiment depicted in FIG. 1A, the deduplication controller 110 uses a hash table 114 and a hash table overflow memory 116 to keep track of previously received packets. The hash table 114 can be implemented, for example, using an external memory device, such as a dynamic random access memory (DRAM) device. The hash table overflow memory 116 can be implemented, for example, using a CAM (content addressable memory) device. The deduplication controller 110 can be configured to access the hash table 114 within the external memory device through a memory controller 112, if desired.

In operation, the deduplication controller 110 uses the first hash value 122 to indicate a row address location in the hash table 114. In addition, at each row of the hash table 114, one or more second hash values 124 can be stored. For example, if desired, four (4) large hash values 124 can be stored in each row of the hash table 114. As described above, it is preferable for the first hash values 122 to be smaller than the second hash values 124. Once the deduplication controller 110 has accessed a row using the small hash value 122, the duplication controller 110 retrieves each of the large hash values 124 stored at the designated row. These retrieved large hash values are compared with the large hash value for the current packet. If a match is found, the current packet is deemed to have already been received and determined to be a duplicate packet. If no match is found, the deduplication controller 110 can be configured to then look to data from an overflow memory as described below, or can conclude that the packet is not a duplicate without an additional step. If deemed not to be a duplicate, the large hash value 124 for that packet is stored by the deduplication controller 110 in the hash table 114 at the next available entry within the row identified by the small hash value 122. The deduplication controller 110 also operates to provide the appropriate DELETE or PASS command to the FIFO buffer 130 through control signal 131. It is noted that the likelihood of correctly identifying a packet as a duplicate packet using hash value comparisons is related to collision resistance of the hash function. Thus, where two hash values are used, it is again noted that using two or more unrelated hash functions improves the likelihood of correctly identifying a packet as a duplicate packet.

For a more robust solution, a hash table overflow memory 116, such as a CAM device, can be used. For example, if there is no room to store the large hash in the row identified by the small hash value 122 because the storage locations in that row are already full in the hash table 114, the deduplication controller 110 can instead store both the small and large hash values 122/124 in the hash table overflow memory 116. Thus, when such an overflow memory 116 is used, if a large hash value is not matched by looking to the hash table 114, the deduplication controller 110 can also compare the small and large hash values 122 and 124 to the contents of the hash table overflow CAM 116. If a match is found from this additional comparison, the current packet is deemed to have already been received and determined to be a duplicate packet. If no match is found, the current packet can be deemed not to be a duplicate. Again, the deduplication controller 110 also operates to provide the appropriate DELETE or PASS command to the FIFO buffer 130 through control signal 131.

As described herein, a deduplication window implemented by a deduplication window controller 125 can be used to limit the amount of packet related data that is stored at any one time for previously received packets, thereby reducing the required size of the data storage system utilized. As depicted, the deduplication window controller 125 includes an aging buffer 128 and a scheduler 118, and timestamps from timestamp generator 108 are being used to define the deduplication window. If desired, the aging buffer 128 can be implemented using a FIFO buffer, and the scheduler 118 can be implemented using control circuitry, as desired.

As depicted, the aging FIFO buffer 128 receives the small hash value 122, a current timestamp 120 from a timestamp generator 108, the DELETE/PASS control signal 131 from the deduplication controller 110, and memory location information 136 from the deduplication controller 110. If a PASS indication is presented on control line 131, the deduplication controller 110 sends to the aging FIFO buffer 128 the column address 136 for the location of the large hash value 124 being stored in the hash table 114, or the location information for the hash values 122/124 stored in the overflow memory 116. The aging FIFO buffer 128 then stores the aging information for the packet (e.g., small hash value, timestamp, memory location). If a DELETE indication is presented on control line 131, the aging FIFO buffer 128 discards the information for the packet and does not store it.

The aging FIFO buffer 128 also provides the data 134 associated with the oldest packet in the buffer to the scheduler 118. This data 134 can include, for example, the small hash value, the hash table column location and the timestamp for the packet. It is also noted that the timestamp information stored in the aging FIFO buffer 128 can include a desired amount of aging time already added to the value. As such, the timestamp data stored in the aging buffer 128 and later provided by the aging buffer 128 to the scheduler 118 will already include the desired amount of aging time. As such, the scheduler 118 need only compare the timestamp data to the current timestamp 120 to determine if data stored for a previous packet should be removed by the deduplication controller 110 due to the lapse of time. Thus, based upon an elapsed amount of time, the data associated with previously received packets can be removed.

In one embodiment, therefore, the scheduler 118 can be configured to compare the timestamp data for the next packet in the aging FIFO buffer 128, as provided by data 134, to the current timestamp 120, which can be provided by the timestamp generator 108. If a threshold amount of time has not passed, the scheduler 118 can be configured not to take any action. However, if the threshold amount of time has passed, the scheduler can be configured to send control signals and data on signal line 138 to the deduplication controller 110 so that the packet information can be discarded for the expired packet. These control signals and data on signal line 138 can include instructions to delete the information stored at a particular row and column within the hash table 114 or stored at a particular location within the hash table overflow memory 116. This data on signal line 138 can include, for example, the small hash value 122 (row), the column information and/or the CAM location and/or other information as desired.

It is noted that the deduplication window determined by the deduplication window controller 125 can be defined by one or more desired parameters, including a period of time, a number of stored prior packets, and/or other parameters used alone or in combination. Further, these parameters can be made to be configurable, if desired. For example, where an amount of time is used, the amount of time could be adjusted during operation to thereby adjust the deduplication window. Further, if desired, the deduplication window parameters could be dynamically configured based upon an analysis of current network conditions. The deduplication window parameters could also be automatically configured by the deduplication system or another device through control signals sent to the deduplication system. Further, the deduplication window parameters could be configured through a user interface, if desired. Other variations could also be implemented as desired. It is further noted that larger deduplication windows will generally allow for removal of more duplicate packets, and smaller deduplication windows will generally allow for the removal of fewer duplicate packets. However, high speed performance can suffer if deduplication windows are made too large thereby requiring the in-line processing of larger amounts of packet related data and/or hash values. In short, the deduplication window size and associated deduplication window parameters can be selected, configured and/or adjusted to achieve the desired operational performance. These parameters can then be fixed for further operation of the deduplication system, or these parameters can be adjusted or configured both automatically and/or manually during operation of the deduplication system. Thus, the deduplication window parameters can be selected, configured and/or adjusted to achieve desired performance goals for a particular implementation or for changing network conditions.

The deduplication controller 110, therefore, uses the hash values 122/124 to determine if a packet has already been received through a comparison with stored hash values for previously received packets within the deduplication window. And the deduplication window controller 125 operates to control the deduplication window for the packet stream to limit the amount of data stored and processing required. The buffer 130 can then be controlled so that duplicate packets within the output packet stream 132 are significantly reduced if not eliminated within the deduplication window.

Using the embodiments described herein, in-line removal of duplicate packets can occur at packet stream data rates of 1 Gbps and above and, more particularly, at packet stream data rates of 10 Gbps and above. For such high speed processing, at full line-rate, the incoming packets within the input packet stream 102 are held for a relatively short period of time within the packet buffer 130 before being passed to or deleted from the output packet stream 132, thereby allowing for real-time downstream processing of deduplicated packet streams. Also for this processing, the long term average packet processing rate should preferably be equal to or exceed the incoming packet rate even at full line-rate and even for all packet sizes including the smallest possible packets. For example, at 10 Gbps the packet rate for the smallest packet size of 64 bytes is 14,880,952 packets per second. It is preferable that the decision to delete or pass a packet be made at that same rate or packets will back up in the packet buffer. This results in additional delay being added to the outgoing data stream. If the processing were simply 1000 packets per second behind, the outgoing packet stream would be almost 6 seconds behind at the end of one day of processing. Additionally, the packet buffer is limited in size to available memory. To prevent overflow, packets would need to be released unprocessed thus degrading the performance of the deduplication function. Because the packet processing happens in real-time, the packet buffer FIFO does not need to be very large. This implies the hold time in the packet buffer, while decision is being made, is relatively small. With respect to a line-rate of 1 Gbps and packet sizes between 64 and 1518 bytes, for example, a hold time of about 20 microseconds or less is preferable for the incoming packets. With respect to a line-rate of 10 Gbps and packet sizes between 64 and 1518 bytes, for example, a hold time of about 2 microseconds or less is preferable for the incoming packets. More generally, a hold time of 1 second or less is preferable for current network communications, such as IP (Internet Protocol) based communications (e.g., Ethernet communications).

Looking back to FIG. 1A, the operation of the deduplication system 100 will now be further described.

In operation, once an incoming packet within the input packet stream 102 is received, a timestamp 120, an N-bit first hash value (small) 122, and Z-bit second hash value (large) 124 are generated for this incoming packet. If only a portion of the packet is to be examined (e.g., a particular networking layer), a control signal 126 may be used to determine what portions of the packet are utilized by the hash generator 103 to generate the hash values 122/124. While the hash values 122/124 are being generated, the packet is also stored in the buffer 130.

Once calculated, the N-bit hash 122 and Z-bit hash 124 are provided to the deduplication controller 110. The deduplication controller 110 accesses the hash table within memory device 114 to retrieve one or more entries (e.g., up to Y-entries) stored at the N-bit hash address and simultaneously sends a combined hash value (N-bits+Z-bits) to the overflow memory 116. In the hash table address identified by the N-bit hash value, there are up to Y-entries of Z-bit hash values that have been stored for previous packets. Further, each address location can be configured to utilize one or more control bits to indicate whether or not the address location is empty so that an empty address location can be skipped. It is noted that while the use of one or more in-use/empty control bits for storage locations will likely improve performance, such control bits could be left out, if desired.

The deduplication controller 110 then compares each one of the Z-bit hash values pulled from the hash table 114 to the Z-bit hash value for the new incoming packet. If a match is found in the hash table 114 or in the overflow memory 116, then that packet will be deemed a duplicate packet and will be discarded. If there are no matches from the hash table 114 or the overflow memory 116, then the Z-bit hash for the incoming packet is stored in the hash table at the N-bit hash value address location, if there is room, and the packet is allowed to leave the buffer 130 to become part of the output packet stream 132. If there is no room in the hash table at the N-bit hash value address location, an entry including both hash values (e.g., N-bit+Z-bit) is placed in the overflow memory 116. If the overflow memory 116 is full, the hash values can be discarded, and the packet can be allowed to pass to the output packets steam 132. The memory location information 136 of the newly stored information (e.g., in hash table 114 or in overflow memory 116) are then forwarded to the aging buffer 128. As described above, the aging buffer 128 also receives the N-bit hash value 122 and the timestamp 120.

As described above, a deduplication window based upon passage of time can be used to limit the amount of data stored.

For example, when the packet information has been stored for a certain time in the aging buffer 128, as determined by the scheduler 118, its N-bit hash value and column location (e.g., in the hash table 114) or index value (e.g. if in the overflow CAM 116) are forwarded through signal line 138 to the deduplication controller 110. The deduplication controller 110 then deletes the information for this packet from the hash table 114 or the overflow memory 116 to make room for additional information associated with newly received packets.

It is noted that the operational parameters selected for the deduplication controller 110 can also be made to be configurable, if desired. For example, the number of entries allowed in the overflow memory 116 could be made configurable. The number (Y) of entries per row address within the hash table 114 could be made to be configurable. Further, as stated above, the parameters used by the deduplication window controller 125, such as the time threshold and/or a number of stored packets threshold, could be made to be configurable. These configurable parameters could also be adjusted dynamically based upon network parameters. Further, these configurable parameters could be adjusted automatically, if desired, or they could be adjusted through a user interface, if desired. Other variations could also be provided to allow for configurability within the deduplication system, as desired.

It is noted that the embodiment of FIG. 1A including a deduplication window controller 125 can encounter circumstances where a duplicate packet would be classified as a non-duplicate packet, even though duplicate packets arrive within the deduplication window of each other. This can occur, for example, where three or more identical packets are received relatively closed together. For example, assume a time parameter is used for the deduplication window, this window is set to 1 milliseconds (ms), and three identical copies of a packet arrive at T=0, T=0.8 ms and T=1.1 ms. In this circumstance within the embodiment of FIG. 1A, the first identical packet will be passed as an original packet, and the second identical packet will be identified and deleted as duplicate. The third identical packet, however, will not be marked as duplicate because at T=1 ms the deduplication window controller 125 will have caused the hash value stored for the first identical packet to be deleted based upon the deduplication window of 1 ms. As such, when the third identical packet arrives at T=1.1 ms, it will appear to be a new non-duplicate packet. Alternatively, another extreme condition could be considered where all incoming packets are identical packets. In this extreme case, one duplicate packet would be passed during every deduplication window.

While classification of a duplicate packet as a non-duplicate packet within circumstances such as these examples may not be a significant problem for desired performance requirements, the embodiment of FIG. 1A could be modified to take into account and attempt to prevent this result. For example, rather than storing information only for non-duplicate packets in the aging FIFO 128, information can be stored for each incoming packet regardless of whether it is deemed a duplicate or not. In addition, the deduplication controller 110 can store a count value in addition to the large hash value 124 stored for each packet in the hash table 114 and/or in addition to the hash values stored for each packet in the overflow memory 116. For such an implementation, the count value can be used to represent the number of copies of that packet that are in the aging FIFO 128. When a duplicate packet is identified, the deduplication controller 110 increments the count value associated with the packet data stored in the hash table 114. When an original or a duplicate packet then ages out of the aging FIFO 128, the deduplication controller 110 then decrements the count value. If the count value becomes zero, then the information for that original packet is deleted from the hash table 114. It is noted that the count value could be stored, if desired, as part of the control bits 232 shown in FIG. 2B for each Z-bit value within the hash table 114 and/or could be stored in addition to the hash values stored within the overflow memory 116. Other memory configurations could also be implemented, as desired, that utilize count values associated with received packets.

FIG. 1B is a flow diagram of an embodiment 150 for in-line removal of duplicate network packets using both a hash table and an overflow table. In block 152, an input packet within an input packet stream is received. In block 154, multiple hash values are generated for the input packet using one or more hash algorithms. In block 155, at least one hash value is used to address or access a table including stored hash values associated with previously received network packets. In decision block 156, a determination is made whether a hash value associated with the received packet matches a hash value previously stored in the hash table. If the answer is "YES," then flow passes to block 160 where the received packet is deleted from the outgoing packet stream. If the answer is "NO," then flow passes to decision block 158 where a determination is made whether or not a hash value associated with the received packet matches a hash value stored in an overflow table. If the answer in block 158 is "YES," then flow passes to block 160 where the received packet is deleted from the outgoing packet stream. If the answer in block 158 is "NO," then flow passes to block 161 where the hash value for the received packet is stored in the hash table, if there is room, or in the overflow table if there is not room in the hash table. Flow then passes to block 162 where the packet is passed into the outgoing packet stream. It is noted that if there is no room in the overflow table to store the hash value, the hash value can be discarded, and flow can still pass to block 162. From either block 160 or block 162, flow then passes back to block 152 where a new packet is analyzed.

It is noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits) and/or other programmable integrated circuitry. In addition, one or more processors running software or firmware could also be used, if desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs) and/or processors to perform the processes, functions and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

FIG. 2A provides an example embodiment for configuration of a hash table 114 stored in memory or other storage device. As described above, multiple hash values can be generated using one or more hash algorithms. In the embodiment of FIG. 2A, an N-bit hash value and a Z-bit hash value are utilized with the Z-bit hash value being preferably larger than the N-bit hash value. The hash table 114 is organized such that a row address (R1, R2 ... RX) 204 is determined by the N-bit hash value ($2^N$ rows), and Y columns of data are stored for each row address. As depicted, the Z-bit hash value entries for Y different packets can be stored in the Y columns (C1, C2 ... CY) 202. It is noted that these embodiments are simply examples for memory organization, and other configurations could be utilized, if desired. It is also noted that, if desired, a 21-bit hash value can be used for the N-bit first hash value. A 64-bit hash value can be used for the Z-bit second hash value. And 4 entries can be used for the Y entries for each row address. For this example implementation, therefore, the hash table 114 can be organized, for example, as $2^{21}$ rows by 4 entries per row by 64-bits per entry (e.g., about 2,097,152 rows×4 columns×64 bits or about 512 Mbits or 64 Mbytes).

FIG. 2B provides an example embodiment for configuration of the hash table 114 that includes one or more control (CTRL) bits 232 also stored within the hash table 114 for each storage location. As with FIG. 2A, the hash table 114 is organized such that a row address (R1, R2 RX) 204 is determined by the N-bit hash value ($2^N$ rows) and such that Z-bit hash value entries are stored in Y columns (C1, C2 ... CY) 202. As shown in FIG. 2B, one or more control (CTRL) bits 232 can be stored with respect to each storage location within the hash table 114. As indicated above, these control bits can identify whether or not storage locations have been filled with hash values. For example, the control bits 232 could be 1-bit flag used to provide an in-use or empty indication as to whether or not a particular storage location holds a Z-bit value. It is noted that the number of control bits and how they are utilized could be modified as desired, while still using the deduplication techniques described herein. For example, the control bits could also be used to store a count value for each received packet, as described above. Further, it is again noted that these embodiments are simply examples for memory organization, and other configurations could be utilized, if desired.

FIG. 2C provides an example embodiment for configuration of the overflow memory 116, which can be implemented as a CAM (content addressable memory), if desired. As depicted, the overflow CAM 116 can have a desired number of rows, with each row being able to store hash values. For example, each of the CAM overflow rows 252 can hold the N-bit first hash value and the Z-bit second hash value. It is noted that CAMs typically operate at high speed and perform lookups very quickly, but are much more complex than ordinary static or dynamic memories. Consequently, CAMs are usually small, having only hundreds or thousands of entries, as opposed to the millions of entries in standard static or dynamic memories. This high speed operation makes a CAM useful as an overflow memory for the deduplication system 100. As such, the overflow CAM 116 is used to store hash values associated with a limited number of additional packets if the hash table 114 is full at the particular row address for the packet. For example, further to the example above, a small CAM configured to have 16 entries of 85 bits per entry (e.g., 21-bits plus 64-bits) can be used, if desired.

It is also noted that a CAM could be used for the primary hash table, if desired. In such an embodiment, the hash values (e.g., N-bit hash and Z-bit hash) generated for the received packet would also be stored in the CAM as opposed to using a first hash value as an address location and a second hash value as the stored entry value. In operation, a comparison would be made between hash values generated for newly received packets and hash values stored in the CAM as the primary hash table. It is further noted that a plurality of CAMs could also be utilized for a primary hash table and/or for an overflow hash table, as desired.

FIG. 3 is a block diagram for an embodiment 300 that includes the use of load balancing and multiple deduplication engines to process an input packet stream. For the embodiment depicted, the input packet stream 301 is received by load balancer 302. Load balancer 302 separates the input packet stream into multiple different packet streams 304A, 304B, 304C . . . and provides these different packet streams to multiple deduplication engines 100A, 100B, 100C . . . for removal of duplicate packets. The individual output packet streams 306A, 306B, 306C . . . from the multiple deduplication engines 100A, 100B, 100C . . . can then be sent to a combiner 304. Combiner 304 can be configured to combine the different packet outputs into a single output packet stream 310. It is also noted that one or more of the individual output packet streams 306A, 306B, 306C . . . could also be used for downstream processing, if desired.

In operation for this embodiment, therefore, multiple deduplication engines 100A, 100B, 100C . . . would be used, each with local memory storage of hash values associated with their respective individual input packet streams 304A, 304B, 304C . . . received from the load balancer 302. Each of the deduplication engines 100A, 100B, 100C . . . would then operate to identify duplicate packets in parallel. It is also noted that hash algorithms could also be used to help generate the multiple input packet streams 304A, 304B, 304C . . . so that duplicate packets will end up in the same stream. For example, a pre-hash operation could be performed on the input packet stream 301, and the results could be used to help determine into which input packet streams 304A, 304B, 304C . . . to place each packet, thereby causing duplicate packets to end up in the same stream.

Such an embodiment helps to divide the required memory bandwidth, but can exhaust available memory or logic resources, particularly where actual contents of packets are used for match determination. For example, a large FPGA, such as an Altera STRATIX IV 360 device, could be used to implement the embodiment 300 for a direct content comparison embodiment. An Altera STRATIX IV 360 device has approximately 18 Mbit (megabits) of internal memory available, which would provide storage for about 144 jumbo packets with 16 k bytes per jumbo packet (i.e., 16,000 8-bit bytes per packet). With such a solution, for example, the input packet stream could be divided into 16 different packet streams and spread across 16 deduplication engines with each having memory storage for only 9 jumbo packets. It is noted that with a memory storage for 144 jumbo packets, the embodiment 300 would have a deduplication window of under about 10 microseconds for a packet stream speed of about 10 Gbps (assuming a case where smallest size packets are received by the deduplication controller). It is further noted that an Altera STRATIX IV 360 device could also be utilized to implement other embodiments described herein that do not utilize multiple deduplication engines.

Another alternative embodiment could include a direct comparison of content for a packet identified as a duplicate packet with stored content for previously received packets. In such embodiments, actual content within each packet (e.g., a portion of the packet content to the full content for packet) is compared to content from previously received packets. For example, the deduplication process described above with respect to FIG. 1A could be used, and if a packet is identified as a duplicate packet, an additional direct packet comparison step could be conducted. For this direct packet compare step, content within the current packet identified as a duplicate is compared with the content stored for previously received packets. This additional direct comparison process could be used as an additional reliability step to make sure packets identified as duplicates were indeed duplicates. For example, one or more hash values related to an incoming packet could first be used and compared to one or more hash values for previously received packets. If a match is found, then content for the incoming packet is compared with stored packet content for previously received packets having the same hash value. If a match is also found for this direct content comparison, then the incoming packet is confirmed to be a duplicate packet and is deleted from the output packet stream. If no match is found after the packet data comparison, the incoming packet is deemed to be a non-duplicate packet and is allowed to pass to the output packet stream. The content for this non-duplicate incoming packet can then also be stored along with its one or more hash values. A further alternative embodiment could include the use of a first hash value to identify a memory address location, as described above, followed by a direct comparison of packet contents for the incoming packet to contents for previously received packets.

It is noted that a direct packet comparison solution implemented without using any hash values could severely degrade performance. Such a solution would be significantly constrained by memory bandwidth. The memory bandwidth requirement increases as a product of the number of packets stored in memory. So to deduplicate over 10 packets at speeds of 10 Gbps, a memory bandwidth of 100 Gbps would be needed to read and compare the packets for duplication along with an additional 10 Gbps for storing the current packet (e.g., if it is not a duplicate). Such a direct comparison only embodiment, therefore, is memory bandwidth constrained at 10 packets or a deduplication window of under 1 microsecond for minimum size packets for these parameters.

FIG. 4 is a block diagram of another embodiment 400 for a packet deduplication system. The input packet stream 102 is provided to a packet buffer 130 that stores the incoming packets pending the decision to delete or pass the packets to the output packet stream 132. The hash generator 103 receives the input packet stream 102 and generates one or more hash values using one or more hash algorithms. The one or more hash values are provided to the deduplication controller 110 through signal lines 404. The one or more hash values, or a subset thereof, can also be provided to the deduplication window controller 125 through signal lines 406. It is further noted that a portion of the incoming packets could be processed for deduplication, if desired, such that not all of the received incoming packets are processed through the deduplication system. The packets selected for deduplication can then be processed to make a delete or pass determination, and the packets not selected for deduplication processing can simply be passed along to the output packet stream 132. Other variations could also be implemented, as desired.

The deduplication controller 110 utilizes at least one hash value to locate data for previously received packets 403 that is stored within data storage system 402. As described herein, the data stored for each previously received packet can be a wide variety of data associated with previously received packets, such as hash values calculated from the packet contents, the packet contents itself, and/or other data generated based upon the previously received packet. For example, in the embodiment described above with respect to FIG. 1A, data storage locations within the data storage system 402 can be configured to store one or more hash values associated with previously received packets. These stored hash value(s) are then obtained from the data storage system 402 by the deduplication controller 110 and used by the deduplication controller 110 for comparison to a second hash value associated with the current incoming packet. If a match is found, the current incoming packet is deemed a duplicate packet, and the control signal 131 is a DELETE control signal. If a match is not found, the current incoming packet is deemed not to be a duplicate packet, and the control signal 131 is a PASS control signal. If a match is not found, the deduplication controller 110 also stores at least the second hash value for the current incoming packet in the data storage system 402. It is also again noted that additional processing steps can be provided, if desired, before a packet is finally deemed to be a duplicate packet or deemed not to be a duplicate packet. For example, an overflow table can be analyzed prior to a final duplicate determination, or a direct packet compare can be conducted prior to a final duplicate determination, as described herein.

The deduplication controller 110 provides the DELETE/PASS control signal 131 to the packet buffer 130. If the control signal 131 is a DELETE control signal, the current packet is removed or deleted from the packet buffer 130 so that it does not become part of the output packet stream 132. If the control signal 131 is a PASS control signal, the current packet is allowed to pass from the packet buffer 130 so that it does become part of the output packet stream 132.

The deduplication window controller 125 operates to limit the amount of information stored with respect to incoming packets. As described above, the deduplication window controller 125 can utilize one or more parameters to form a deduplication window. For example, timestamps can be used so that packet information is only stored for a particular amount of time. Further, a threshold value associated with a particular number of packets can be used so that only information associated with a certain number of packets is stored. Still further, other parameters could be utilized, and combinations of parameters could also be utilized, if desired. For example, the deduplication window could be based both upon either a particular amount of time having passed or a particular number of packets having been stored. The deduplication window controller 125 can also receive one or more hash values through signal lines 406 from the hash generator 103 and can receive memory location information 136 and the DELETE/PASS control signal 131 from the deduplication controller 110, if desired. The deduplication window controller 125 utilizes this information to make determinations as to when to remove data stored for previously received packets. In part, the deduplication controller 125 can send control signals 138 that provide information to the deduplication controller 110 with respect to which packet information to remove. In this way, a deduplication window is created for storing deduplication related information for previously received packets.

It is noted that various embodiments could be implemented to take advantage of the deduplication techniques described herein. As described above, the hash generator 103 can be implemented using one or more hash algorithms to generate the one or more hash values. As described above, it is desirable to generate at least two hash values with one being larger than the other. The smaller first hash value can then be used to provide an address location for data stored in the data storage system 402, and the second larger hash value can be then be stored in the data storage system 402. Further, the hash generator 103 can be used to generate a hash value that is used to identify data within the data storage system 402, and this data can be actual contents of previously received packets. Further, the hash value can be used to determine an address location within the data storage system 402, such as where one or more dynamic random access memory (DRAM)

devices are used to implement the data storage system 402. Also, the hash value can be used to directly access data within the data storage system 402, such as where a content addressable memory (CAM) device is used to implement the data storage system 402. As such, it is recognized that the one or more hash values generated by the hash generator 103 could be used by the deduplication controller 110 in a wide variety of ways to take advantage of the deduplication techniques described herein.

It is also again noted that the data storage system 402 can be implemented in a wide variety of configurations, as desired, to provide locations or entries were data associated with previously received packets can be stored. For example, as shown with respect to FIG. 1A, the data storage system 402 can be implemented with one or more external devices, such as DRAM devices, a memory controller for the external memory, and an additional overflow memory, such as a CAM device. It is also again noted that a CAM device could be used for the primary hash table, if desired. Other memory devices and configurations could also be used to implement the data storage system 402, as desired.

In one further embodiment where actual contents of previously received packets are stored for comparison purposes, for example, the data storage system 402 could be implemented using a first smaller memory device configured to store address pointers to a second larger memory device configured to store the actual packet contents. In such an embodiment, a hash value generated by the hash generator 103 could be used to identify an address location within the first memory device. One or more pointers could be stored at each address location, and these pointers can point to one or more address locations in the second larger memory device where the actual packet contents are stored. In such an embodiment, the first memory device could be configured similar to the embodiments of FIGS. 2A-2B with pointers being stored at each address location instead of Z-bit hash values. These pointers would then be used to obtain the actual packet contents from the second larger memory device. The deduplication controller 110 could then use the stored packet contents obtained from the second memory device to compare with contents from the current incoming packet to make the match determination of whether the incoming packet is or is not a duplicate packet. As stated above, this use of actual packet contents can reduce or eliminate false indications of duplicate packets. Further, it is noted that the first memory device could be a larger memory device and could be configured to stored the contents for previously received packets rather than using a second memory device. In such a further embodiment, the first memory device could be configured similar to the embodiments of FIGS. 2A-2B with contents of previously received packets being stored at each address location instead of Z-bit hash values.

As also described herein, the deduplication window controller 125 can be implemented in a variety of ways, as desired, to generate a deduplication window to limit the amount of data stored with respect to previously received packets. For example, as shown with respect to FIG. 1A, an aging FIFO buffer and a scheduler can be used to provide a deduplication window based upon timestamps generated by a timestamp generator. Other implementations for the deduplication window controller 125 can also be provided, as desired.

The deduplication controller 110 can also be implemented in a variety of ways, as desired, to perform match determinations between incoming packets and previously received packets. For example, the deduplication controller 110 can be configured to utilize any desired number of different hash values, and additional parameters and techniques could also be used in addition to those described herein in order to determine if a duplicate packets have been received. For example, in a further embodiment as described above, the deduplication controller 110 can directly compare content within an incoming packet to content stored for previously received packets. Thus, in addition to using one or more hash values to identify duplicate packets, a comparison of the actual data within the incoming packet to previous packets can also be performed. This additional packet comparison is useful, for example, to help eliminate false duplicate packet indications that may occur if hash values match but the actual packets are not duplicates. As depicted in FIG. 4, therefore, the input packet stream can also be provided to the deduplication controller 110, and the deduplication controller can also store content data associated with received packets in the data storage system 402. It is again noted that the data storage system 402 can be implemented using a wide variety of devices and/or configurations, as desired.

As indicated above, using the embodiments described herein, in-line removal of duplicate packets can occur at packet stream data rates of 1 Gbps and above and, more particularly, at packet stream data rates of 10 Gbps and above. As stated above, for such high speed processing, at full line-rate, the incoming packets within the input packet stream 102 are held for a relatively short period of time within the packet buffer 130 before being passed to or deleted from the output packet stream 132, thereby allowing for real-time downstream processing of deduplicated packet streams. Also for this processing, the long term average packet processing rate should preferably be equal to or exceed the incoming packet rate even at full line-rate and even for all packet sizes including the smallest possible packets. For example, at 10 Gbps the packet rate for the smallest packet size of 64 bytes is 14,880,952 packets per second. It is preferable that the decision to delete or pass a packet be made at that same rate or packets will back up in the packet buffer. This results in additional delay being added to the outgoing data stream. If the processing were simply 1000 packets per second behind, the outgoing packet stream would be almost 6 seconds behind at the end of one day of processing. Additionally, the packet buffer is limited in size to available memory. To prevent overflow, packets would need to be released unprocessed thus degrading the performance of the deduplication function. Because the packet processing happens in real-time, the packet buffer FIFO does not need to be very large. This implies the hold time in the packet buffer, while decision is being made, is relatively small. With respect to a line-rate of 1 Gbps and packet sizes between 64 and 1518 bytes, for example, a hold time of about 20 microseconds or less is preferable for the incoming packets. With respect to a line-rate of 10 Gbps and packet sizes between 64 and 1518 bytes, for example, a hold time of about 2 microseconds or less is preferable for the incoming packets. More generally, a hold time of 1 second or less is preferable for current network communications, such as IP (Internet Protocol) based communications (e.g., Ethernet communications).

FIGS. 5A and 5B provide example flow diagrams for using one or more hash values to perform a match determination for identifying duplicate packets and for performing a match determination, respectively.

FIG. 5A is a flow diagram of an embodiment 500 that utilizes one or more hash values to determine whether incoming packets match previously received packets in order to identify duplicate packets and remove them from an output packet stream. In block 502, one or more hash values are generated from an incoming packet. In block 504, one or more hash values are used to locate data for one or more previously received packets stored in a data storage system. A packet match determination is then performed in block 506. In decision block 508, a determination is made as to whether a match has been found. If "YES," then flow passes along path 510 to block 512 where the packet is deleted so that it does not appear in the output packet stream. If "NO," then flow passes along path 514 to block 516 where the packet is passed so that it is included in the output packet stream, and packet data associated with the passed packet is stored. The data stored for the passed packet thereby becomes data associated with a previously received packet that can be used for subsequent match determinations. Whether block 512 or block 516 is reached, flow then passes back to block 502 for processing of another incoming packets within the input packet stream.

FIG. 5B is a flow diagram of an example embodiment for the match determination block 506. As described herein, the match determination process can be implemented in a wide variety of ways and can include one or more match determination steps. For example, the data stored for previously received packets can include hash values generated from these packets, contents of the packets, and/or other data associated with the previously received packets. This data can then be used in the match determination process to determine if a current incoming packet is a duplicate packet. Further, this match determination process can be conducted in one or more different match determination steps based upon the data for previously received packets in comparison with data for the current incoming packet.

For the embodiment depicted, in block 552, one or more hash values generated for the incoming packet are compared against one or more hash values stored with respect to previously received packets. Decision block 554 is then reached where a determination is made as to whether a match has been found. If "NO," then flow passes along path 514, which can then lead to block 516 in FIG. 5A where the packet is passed. If "YES," then flow passes to a second match determination block 556. For the embodiment depicted, in block 556, packet contents from one or more previously received packets are compared with contents from the current incoming packet. Decision block 558 is then reached where a determination is made as to whether a match has been found. If "NO," then flow passes along path 514, which can again lead to block 516 in FIG. 5A where the packet is passed. If "YES," then flow passes along path 510, which can lead to block 512 in FIG. 5A where the packet is deleted.

It is noted that additional match determination steps could be utilized if desired, for example, by including them within the "YES" process flow path 510 and prior to block 512 where the packet is deleted based upon a final match determination. It is also noted that a match determination of packet contents, such as is provided with blocks 556 and 558 could be the first and/or only match determination, for example, where the data stored for previously compared packets is only content data. Further, match determination steps could also be conducted in parallel, if desired. For example, the match determinations provided by blocks 552/554 and 556/558 could be performed at the same time in parallel rather than being conducted serially one after the other. Further, it is again noted that the match determination steps could be implemented in different ways and can use a variety of different data, as desired, and the embodiment of FIG. 5B is simply one example.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A packet deduplication system for reducing duplicate packets in a packet stream, comprising:
   a packet buffer configured to store a plurality of incoming packets from an input packet stream;
   a hash generator configured to apply at least one hash algorithm to at least a portion of the plurality of incoming packets to generate first and second hash values, the portion representing packets to be processed for deduplication, and the first and second hash values being generated for each packet processed for deduplication;
   a data storage system configured to store data associated with previously received packets; and
   a deduplication controller configured to use the first hash value for each packet to be processed to determine an address location for data stored in the data storage system, to compare the second hash value for each packet with data stored at the address location to determine if the packet matches a previously received packet, and to generate a control signal based at least in part upon the match determination, the control signal being applied to the packet buffer to determine whether the packet is deleted as a duplicate packet or passed from the packet buffer to an output packet stream as a non-duplicate packet;
   wherein the deduplication controller is further configured to store data in the data storage system at the address location determined by the first hash value for a packets determined not to match previously received packets, the data stored comprising the second hash value for the packet;
   wherein the first hash value is smaller than the second hash value.

2. The packet deduplication system of claim 1, wherein the packet buffer is configured to store all of the incoming packets within the input packet stream.

3. The packet deduplication system of claim 1, wherein the hash generator is configured to apply at least one hash algorithm to all of the plurality of incoming packets stored by the packet buffer.

4. The packet deduplication system of claim 1, wherein the data stored in the data storage system further comprises content from previously received packets, and wherein the deduplication controller is further configured to compare content from each incoming packet with content from previously received packets for the match determination.

5. The packet deduplication system of claim 4, wherein the data storage system comprises a first memory device and a second memory device, wherein the first memory device is configured to store second hash values for previously received packets along with pointers to the second memory device, wherein the first hash values represent address locations within the first memory device, and wherein the second memory device is configured to store content from previously received packets.

6. The packet deduplication system of claim 1, wherein the data storage system is configured to include a plurality of storage locations associated with each address location determined by a first hash value, each of the plurality of storage locations being configured to hold a second hash value.

7. The packet deduplication system of claim 6, further comprising one or more control bits associated with each storage location, the control bits identifying whether the storage location holds a hash value.

8. The packet deduplication system of claim 6, wherein the data storage system comprises a first memory device and a second overflow memory device.

9. The packet deduplication system of claim 8, wherein the first memory device comprises one or more dynamic random access memory devices and the second overflow memory device comprises one or more content addressable memory devices.

10. The packet deduplication system of claim 1, wherein the hash generator is configured to utilize multiple hash algorithms to generate the hash values.

11. The packet deduplication system of claim 1, wherein the hash generator is configured to utilize only two hash algorithms to generate the hash values.

12. The packet deduplication system of claim 1, wherein the data storage system comprises one or more content addressable memory devices.

13. The packet deduplication system of claim 1, wherein the data storage system comprises one or more dynamic random access memory devices.

14. The packet deduplication system of claim 1, further comprising a deduplication window controller configured to provide a remove signal to the deduplication controller, the remove signal being based upon one or more parameters and the remove signal being used by the deduplication controller to remove data stored in data storage system associated with previously received packets.

15. The packet deduplication system of claim 14, wherein the one or more parameters comprises an elapsed amount of time associated with data stored for one or more previously received packets.

16. The packet deduplication system of claim 14, wherein the one or more parameters comprises a number of previously received packets for which data has been stored.

17. The packet deduplication system of claim 14, wherein the one or more parameters comprises a count value associated with a number of times a packet has been received within a time window, and wherein the deduplication window controller is further configured to provide a remove signal for data stored for a packet based upon the count value.

18. The packet deduplication system of claim 14, wherein the deduplication window controller comprises a buffer memory configured to store information associated with previously received packets and a scheduler configured to provide the remove signal to the deduplication controller.

19. The packet deduplication system of claim 14, wherein the one or more parameters are configurable.

20. The packet deduplication system of claim 19, wherein the one or more parameters are dynamically configured based upon one or more network conditions.

21. The packet deduplication system of claim 19, wherein the one or more parameters are configurable through a user interface.

22. The packet deduplication system of claim 1, wherein incoming packets are held within the packet buffer for less than about 1 second if passed as a non-duplicate packet.

23. The packet deduplication system of claim 1, further comprising a memory controller configured to receive the first hash value from the deduplication controller, to use the first hash value as an address location for the data storage system, and to provide data stored at the address location back to the deduplication controller.

24. The packet deduplication system of claim 1, wherein the hash generator is configured to apply a single hash algorithm to concurrently generate the first hash value and the second hash value.

25. The packet deduplication system of claim 1, wherein the hash generator comprises a first hash generator configured to apply a first hash algorithm to generate the first hash value and a second hash generator configured to apply a second hash algorithm to concurrently generate the second hash value.

26. A packet deduplication system for reducing duplicate packets in a packet stream, comprising:
   a packet buffer configured to store a plurality of incoming packets from an input packet stream;
   a hash generator configured to apply at least one hash algorithm to at least a portion of the plurality of incoming packets to generate hash values, the portion representing packets to be processed for deduplication;
   a data storage system configured to store data associated with previously received packets; and
   a deduplication controller configured to use a hash value for each packet to be processed to identify data stored in the data storage system, to use the identified data to determine if the packet matches a previously received packet, and to generate a control signal based at least in part upon the match determination, the control signal determining whether the packet is deleted as a duplicate packet or passed from the packet buffer to an output packet stream as a non-duplicate packet;
   wherein the deduplication controller is further configured to store data in the data storage system for packets determined not to match previously received packets; and
   wherein incoming packets are held within the packet buffer for less than about 20 microseconds if passed as a non-duplicate packet.

27. The packet deduplication system of claim 26, wherein incoming packets are held within the packet buffer for less than about 2 microseconds if passed as a non-duplicate packet.

28. A method for reducing duplicate packets in a packet stream, comprising:
   storing a plurality of incoming packets from an input packet stream within a packet buffer;
   applying at least one hash algorithm to at least a portion of the plurality of incoming packets to generate first and second hash values, the portion representing packets to be processed for deduplication, and the first and second hash values being generated for each packet processed for deduplication;
   using the first hash value for each packet to determine an address location for data stored in a data storage system for previously received packets;
   comparing the second hash value for each packet to data stored at the address location to determine if the packet matches a previously received packet; and
   if the packet is determined to match a previously received packet, deleting the packet from the packet buffer as a duplicate packet; or
   if the packet is determined not to match a previously received packet, passing the packet to an output packet stream as a non-duplicate packet and storing data associated with the packet in the data storage system at the address location determined by the first hash value as data for a previously received packet, the data stored comprising the second hash value for the non-duplicate packet;

wherein the first hash value is smaller than the second hash value.

29. The method of claim 28, further comprising storing all of the incoming packets within the input packet stream.

30. The method of claim 28, further comprising applying at least one hash algorithm to all of stored incoming packets.

31. The method of claim 28, wherein the data stored in the data storage system further comprises content from previously received packets, and further comprising comparing content from each incoming packet with content from previously received packets for the determining step.

32. The method of claim 28, further comprising providing a plurality of storage locations associated with each address location determined by a first hash value, each of the plurality of storage location being configured to hold a second hash value.

33. The method of claim 32, further comprising utilizing one or more control bits associated with each storage location to identify whether the storage location holds a hash value.

34. The method of claim 28, further comprising utilizing multiple hash algorithms to generate the hash values.

35. The method of claim 28, further comprising utilizing only two hash algorithms to generate the hash values.

36. The method of claim 28, further comprising utilizing a deduplication window based upon one or more parameters to remove data stored in the data storage system associated with previously received packets.

37. The method of claim 36, further comprising utilizing elapsed amount of time associated with data stored for one or more previously received packets as a parameter for the deduplication window.

38. The method of claim 36, further comprising utilizing a number of previously received packets for which data has been stored as a parameter for the deduplication window.

39. The method of claim 36, further comprising utilizing a count value associated with a number of times a packet has been received within a time window as a parameter for the deduplication window, and removing data stored for a packet based upon the count value.

40. The method of claim 36, wherein the one or more parameters are configurable.

41. The method of claim 40, further comprising dynamically configuring a parameter based upon one or more network conditions.

42. The method of claim 40, further comprising allowing a parameter to be configured through a user interface.

43. The method of claim 28, further comprising holding incoming packets for less than about 1 second if passed as a non-duplicate packet.

44. The method of claim 28, further comprising providing the first hash value to a memory controller and using the memory controller to access data within the data storage system at the address location determined by the first hash value.

45. The method of claim 28, wherein the applying step comprises applying a single hash algorithm to concurrently generate the first hash value and the second hash value.

46. The method of claim 28, wherein the applying step comprises applying a first hash algorithm to generate the first hash value and applying a second hash algorithm to concurrently generate the second hash value.

47. A method for reducing duplicate packets in a packet stream, comprising:

storing a plurality of incoming packets from an input packet stream;

applying at least one hash algorithm to at least a portion of the plurality of incoming packets to generate hash values, the portion representing packets to be processed for deduplication;

using a hash value for each packet to be processed to identify data stored in a data storage system for previously received packets;

determining if the packet matches a previously received packet using the identified data; and if the packet is determined to match a previously received packet, deleting the packet as a duplicate packet; or if the packet is determined not to match a previously received packet, passing the packet to an output packet stream as a non-duplicate packet and storing data associated with the packet in the data storage system as data for a previously received packet; and, further comprising holding incoming packets for less than about 20 microseconds if passed as a non-duplicate packet.

48. The method of claim 47, further comprising holding incoming packets for less than about 2 microseconds if passed as a non-duplicate packet.

* * * * *

UNITED STATES PATENT AND TRADEMARK OFFICE
CERTIFICATE OF CORRECTION

| | |
|---|---|
| PATENT NO. | : 8,462,781 B2 |
| APPLICATION NO. | : 13/080906 |
| DATED | : June 11, 2013 |
| INVENTOR(S) | : McGhee et al. |

It is certified that error appears in the above-identified patent and that said Letters Patent is hereby corrected as shown below:

In the Claims:

In claim 1, column 22, line 40, delete "packets," and insert --packet--.

Signed and Sealed this
Thirtieth Day of July, 2013

Teresa Stanek Rea
*Acting Director of the United States Patent and Trademark Office*